United States Patent

Adachi

[11] 4,135,435

[45] Jan. 23, 1979

[54] REACTION MECHANISM OF A HYDRAULIC CONTROL VALVE

[75] Inventor: Yoshiharu Adachi, Gamagori, Japan

[73] Assignee: Aisin Seiki Kabushiki Kaisha, Aichi, Japan

[21] Appl. No.: 793,533

[22] Filed: May 4, 1977

[30] Foreign Application Priority Data

May 10, 1976 [JP] Japan .................................. 51/52175

[51] Int. Cl.² ...................... F15B 13/14; F01B 25/02; F15B 9/10
[52] U.S. Cl. ........................................... 91/6; 91/49; 91/372; 91/378; 91/431
[58] Field of Search .................. 91/370, 371, 372, 373, 91/434, 6, 49, 431

[56] References Cited

U.S. PATENT DOCUMENTS

| 2,719,511 | 10/1955 | Presnell | 91/373 |
| 2,761,427 | 9/1956 | Shumaker | 91/373 |
| 3,148,592 | 9/1964 | Schultz et al. | 91/372 |
| 3,937,127 | 2/1976 | Baker et al. | 91/372 |

Primary Examiner—Paul E. Maslousky
Attorney, Agent, or Firm—Oblon, Fisher, Spivak, McClelland & Maier

[57] ABSTRACT

A reaction mechanism of a hydraulic control valve including a control valve for regulating hydraulic pressure by controlling hydraulic fluid disgorged from a pump, an input member mechanically connected to the control valve and operated by a driver, the input member having a smaller diameter portion and a larger diameter portion, an annular reaction regulating member into which the smaller diameter portion of the input member is slidably inserted, a diameter of the annular member being equal to or less than the larger diameter portion of the input member, a biasing member for normally urging the annular member toward the larger portion of the input member, and a member for supplying the hydraulic pressure regulated by the control valve into an area between the annular member and the large diameter portion of the input member to displace the annular member from the larger diameter portion of the input member against the biasing member.

16 Claims, 4 Drawing Figures

REACTION MECHANISM OF A HYDRAULIC CONTROL VALVE

BACKGROUND OF THE INVENTION

1. Field of the Invention

This invention relates to a reaction mechanism of a hydraulic control valve assembly which is operated by a power source such as a hydraulic pump.

2. Description of the Prior Art

In conventional reaction mechanisms of a hydraulic booster having an input piston and a reaction transmitting piston, pressure in a power chamber scarcely acts on the input piston until the pressure in the power chamber increases up to a predetermined value. At this value the pressure in the power chamber acts on the input piston only when the power chamber reaches the predetermined value to engage the input piston with the reaction transmitting piston such that the reaction was transmitted to the driver, with a resulting shock given to the driver upon engagement between the reaction transmitting piston and the input piston.

SUMMARY OF THE INVENTION

Accordingly, it is an object of the present invention to provide a reaction mechanism of a hydraulic control valve assembly, which gives no shock to a driver.

It is another object of the present invention to provide a reaction mechanism of a hydraulic control valve assembly which is mechanically simple and inexpensive to manufacture.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
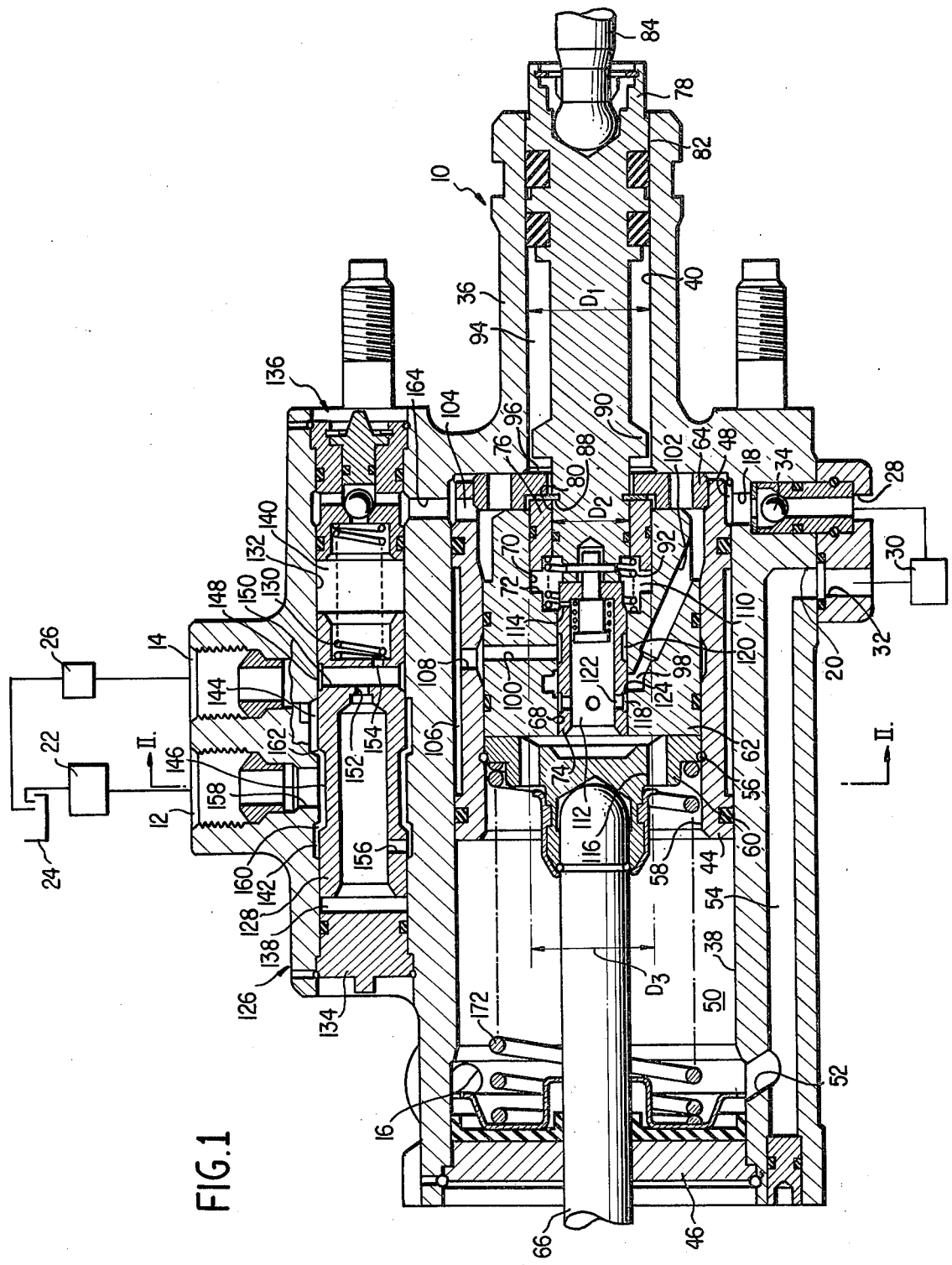
FIG. 1 is a sectional view of one preferred embodiment of the reaction mechanism of a hydraulic control valve assembly constructed in accordance with the teachings of this invention.

In FIG. 1, there is shown a hydraulic booster 10 being provided with inlets 12 and 18 as well as outlets 14, 16 and 20. Inlet 12 is connected to the output side of a main pump 22 and outlet 14 is connected to a reservoir 24 through a hydraulic device 26 which is of an open-center type, such as a power steering gear.

Outlet 16 is connected to reservoir 24, inlet 18 is connected to a discharging port 28 of a second pump 30, and outlet 20 is connected to a suction port 32 of a second pump 30. A check valve 34 is interposed between inlet 18 and discharging port 28 of second pump 30, which permits fluid flow from discharging port 28 to inlet 18 but prohibits the reverse.

A housing 36 of booster 10 is provided with a stepped bore, a larger diameter bore 38 and a smaller diameter bore 40, which is formed with a shoulder 42. A power piston 44 is slidably disposed within larger diameter bore 38 and guide member 46 is sealingly secured to the left side open end of larger diameter bore 38.

Power chamber 48 is defined by the right end of power piston 44 within larger diameter bore 38, and a drain chamber 50 is defined between the left end of power piston 44 and guide member 46 within the larger diameter bore 38. Drain chamber 50 communicates with outlet 16 and with outlet 20 through passages 52 and 54 which are formed within housing 36.

Power chamber 48 communicates with inlet 18 while power piston 44 is in the shape of a hollow pipe. Ring 56 is fixed to an inner wall 58 of power piston 44 near the left end thereof, and a holder 60 and sleeve 62 are assembled in turn to the right of ring 56 as shown in FIG. 1. Holder 60 and sleeve 62 are secured to power piston 44 by means of a nut 64.

Output rod 66 sealingly and slidably passes through the central portion of guide member 46, one end of which projects from the left end of housing 36 and the other end of which is connected to holder 60 such that output rod 66 operates as a body with power piston 44.

Sleeve 62 is provided with a stepped bore having a smaller diameter portion 68 and a larger diameter portion 70. Larger diameter portion 70 is formed with a shoulder 72. Spool 74 is slidably disposed within the smaller diameter bore 68, and an annular reaction regulating piston 76 is slidably disposed within larger diameter bore 70. An input piston 78 having a smaller diameter portion 80 and a larger diameter portion 82 is connected to a push rod 84 so as to operate as a body therewith, whereby input piston 78 is operated by a driver. Smaller diameter portion 80 of input piston 78 is slidably inserted in reaction regulating piston 76, and larger diameter portion 82 is slidably sealingly inserted into smaller diameter bore 40 of the housing 36.

Spool 74 is connected to input piston 78 so as to operate as a body therewith. A stopper ring 88 is secured to smaller diameter portion 80 of input piston 78, which is located between reaction regulating piston 76 and nut 64. Input piston 78 is formed with an annular projection 90 at the part thereof which is near the right end of nut 64. A spring 92 is interposed between sleeve 62 and reaction regulating piston 76, which biases input piston 78 toward the right through reaction regulating piston 76 and stopper ring 88 to contact stopper ring 88 with the left surface of nut 64. Diameter $D_3$ of reaction piston 76 is equal to or less than diameter $D_1$ of larger diameter portion 82 of input piston 78, and diameter $D_2$ of smaller diameter portion 80 of input piston 78 is less than diameter $D_3$ of reaction piston 76.

An annular chamber 94, defined by smaller diameter portion 80 and the left end of larger diameter portion 82 of input piston 78 within smaller diameter bore 40 of housing 36, communicates with power chamber 48 through a groove 96 formed within nut 64. An annular groove 98 is formed in the inner wall of sleeve 62. Sleeve 62 is formed with a vertical passage 100 therein, which is located at right side of the annular groove 98. Annular groove 98 communicates with power chamber 48 through passage 102 which is formed with sleeve 62 and passage 104 which is formed within power piston 44.

Vertical passage 100 communicates with an annular chamber 106 which is formed in the outer periphery of power piston 44 through passage 108 formed in power piston 44 at the central portion thereof. A chamber 110 defined by sleeve 62 and reaction regulating piston 76 communicates with bore 112 of spool 74 through passage 114 which is formed in spool 74 and with drain chamber 50 through passage 116 of holder 60.

Spool 74 is provided with two separated annular grooves 118 and 120 on the outer periphery thereof, groove 118 communicating with bore 112 of spool 74 through passage 122 formed in spool 74 and groove 120 communicating with vertical passage 100 of sleeve 62.

In the position shown in FIG. 1, groove 118 communicates with groove 98 through variable restriction 124 while fluid communication between groove 120 and groove 98 is interrupted. When the spool 74 is moved toward the left, variable restriction 124 is closed and groove 120 communicates with groove 98.

A control valve 126 is disposed in the upper portion of housing 36. Spool 128 and spring 130, which are main components of control valve 126, are disposed in a bore 132 formed in housing 36. The left end of bore 132 is sealingly closed by plug 134 which is fixed to housing 36. A check valve assembly 136 is sealingly fixed to the right end of bore 132. A first chamber 138 and a second chamber 140 are defined by the left and right of spool 128 within bore 132, respectively, as shown in FIG. 1. Spring 130 is disposed in second chamber 140 to normally bias spool 128 toward first chamber 138.

Annular grooves 142 and 144 are provided in turn from the left within the inner wall of housing 36 defining bore 132, and annular grooves 146 and 148 are provided in turn from the left within the outer periphery of spool 128. Annular groove 148 communicates with vertical passage 150 which radially passes through spool 128. Vertical passage 150 communicates with first chamber 138 through orifice 152 and with second chamber 140 through orifice 154. A vertical passage 156 is formed in spool 128, passage 156 being so arranged that fluid communication between groove 142 and first chamber 138 is established. Passage 158 is formed in housing 36 to establish fluid communication between inlet 12 and groove 146 of spool 128, passage 158 being located between grooves 142 and 144.

A variable restriction 160 is defined by groove 142 of housing 36 and groove 146 of spool 128, and a variable restriction 162 is defined by the groove 144 of housing 36 and the groove 146 of the spool 128.

In the operating position shown in FIG. 1, fluid communication between groove 148 and groove 144 is interrupted. When spool 128 is moved toward the left, the restriction of variable restriction 160 is decreased and the restriction of variable restriction 162 is increased. When spool 128 is moved further to the left to close restriction 162, fluid communication between grooves 144 and 148 is established.

Groove 144 communicates with outlet 14, and second chamber 140 communicates with power chamber 48 through check valve assembly 136 and vertical passage 164 formed in housing 36. Check valve assembly 136 is so constructed that it permits fluid flow from second chamber 140 to power chamber 48, but prohibits the reverse.

Figure 2:
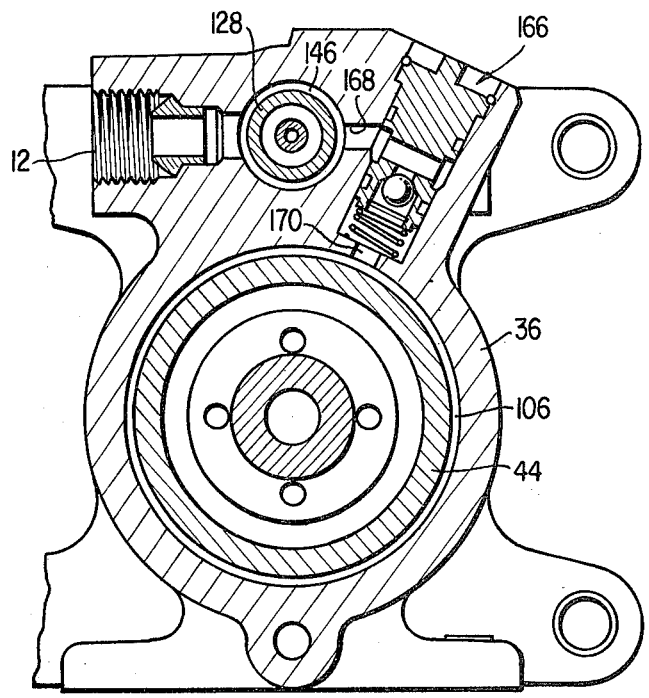
FIG. 2 is a sectional view taken substantially along the lines II—II of FIG. 1.

In FIG. 2, there is shown a check valve assembly 166 interposed between horizontal passage 168 and vertical passage 170 which are formed in housing 36. The check valve assembly 166 is so constructed that fluid flow from horizontal passage 168 to vertical passage 170 is permitted, but the reverse is prohibited. Horizontal passage 168 communicates with inlet 12 through groove 146 of spool 128, and vertical passage 170 communicates with annular chamber 106 formed in the outer periphery of power piston 44. Spring 172, the biasing force of which is stronger than that of spring 92, is interposed between holder 60 and guide member 46 to normally bias power piston 44 toward shoulder 42 to contact power piston 44 with shoulder 42.

In FIG. 1, fluid supplied from main pump 22 flows into grooves 142 and 144 through respective variable restrictions 160 and 162, whereby spool 128 is placed to the position shown. When spool 128 is moved toward the left by means of spring 130 to decrease the restriction of variable restriction 160, fluid in inlet 12 flows into first chamber 138 through groove 146, variable restriction 160, groove 142 and vertical passage 156. Fluid in first chamber 138 further flows into second chamber 140 through orifice 152, vertical passage 150 and orifice 154. Subsequently, pressure in first chamber 138 is increased to a value greater than that in second chamber 140 in that fluid passes through orifices 152 and 154, respectively, to produce a force which opposes the force of spring 130. Consequently, by balance of force, the spring force which is raised against the cross-sectional area of the spool 128 equalizes the pressure difference between first chamber 138 and second chamber 140 wherein the load of spring 130 is almost kept constant, so that the pressure difference between first chamber 138 and second chamber 140 is substantially kept constant and the amount of flow which is supplied to second chamber 140 through orifices 152 and 154 is substantially fixed. Therefore, the fixed flow quantity of fluid supplied to the inlet flows into second chamber 140 and the remainder flows into outlet 14 through variable restriction 162. Fluid disgorged from outlet 14 is supplied to hydraulic device 26, and the fluid supplied to second chamber 140 is supplied to power chamber 48 through check valve assembly 136.

Should main pump 22, which supplies fluid to inlet 12, break down, second pump 30 is operated by a signal of a detecting member, not shown, which detects fluid flow from main pump 22 to reservoir 24, e.g. such as a flow switch to suction fluid in drain chamber 50 through passage 54, outlet 20 and suction port 32 and to supply fluid into power chamber 48 through discharging port 28, check valve 34 and inlet 18.

In operation, fluid supplied to inlet 12 from main pump 22 is divided by control valve 126, with some of the fluid being regulated to a fixed quantity and supplied to power chamber 48 through variable restriction 160, first chamber 138, orifices 152 and 154, second chamber 140, check valve assembly 136 and vertical passage 164. Fluid in power chamber 48 flows into the reservoir 24 through the passage 104, passage 102, groove 98, variable restriction 124, groove 118, passage 122, bore 112, passage 116, drain chamber 50 andd the outlet 16. As mentioned hereinbefore, in the operative position shown in FIG. 1, fluid which flows from vertical passage 164 flows without any resistance, so the pressure in power chamber 48 is substantially zero such that no pressure differential across the power piston 44 is produced. Therefore, power piston 44 is not moved. In this position, since the fluid communication between groove 120 and groove 98 is interrupted, the fluid communication between vertical groove 100 of sleeve 62 which communicates with the inlet 12 and power chamber 48 is interrupted. Therefore, even if the pressure in inlet 12 is increased by, for example, operating hydraulic device 26, the pressure in inlet 12 has no effect on power chamber 48. Also, even if the pressure in annular chamber 106 which communicates with inlet 12 is increased, the pressure has no effect on power piston 44, because both of the effective areas of power piston 44 operatively disposed to chamber 106 are the same.

In this situation, when the driver operates input piston 78 through push rod 84, input piston 78 is moved toward the left with respect to sleeve 62, together with reaction regulating piston 76 through stopper ring 88 against spring 92. As spool 74 moves together with input piston 78, the restriction of variable restriction 124 is increased, whereby the fluid which flows from groove 98 to groove 118 receives the resistance, such that the fluid pressure in the upper stream side from variable restriction 124 is increased. Accordingly, the pressure in power chamber 48 is also increased and power piston 44 is moved toward the left against spring 172 by receiving the force which raises the pressure in power chamber 48 applied to the annular area which results from a subtraction of the area across diameter $D_3$ of reaction regulating piston 76 from the area across the outside diameter of power piston 44, such that the output rod 66 is moved toward the left to operate an actuator, not shown, for example such as a master cylinder. In this time, although the pressure in power chamber 48 acts on input piston 78, piston 78 merely receives a very small reaction force when the pressure in power chamber 48 is lower than a predetermined value. This is because, as reaction regulating piston 76 is connected through stopper ring 88 to input piston 78 by means of spring 92, input piston 78 receives pressure in power chamber 48 which pushes input piston 78 toward the right on an effective annular area thereof which results from the subtraction of the area across diameter $D_3$ of reaction piston 76 from the area across diameter $D_1$ of larger diameter portion 82 of piston 78. Therefore, in the case of diameter $D_3$ being equal to the diameter $D_1$, input piston 78 receives no reaction force.

Moreover, when the driver further moves input piston 78 toward the left, the restriction of variable restriction 124 is further increased, so that the pressure in the power chamber 48 increases more than the predetermined value. When the pressure in power chamber 48 thus increases more than the predetermined value, reaction piston 76 is moved toward the left against the action of spring 92 by receiving pressure in power chamber 48 on the right end face of the annular area between diameter $D_3$ and $D_2$, such that reaction regulating piston 76 comes in contact with shoulder 72 of sleeve 62 as shown in FIG. 3.

Figure 3:
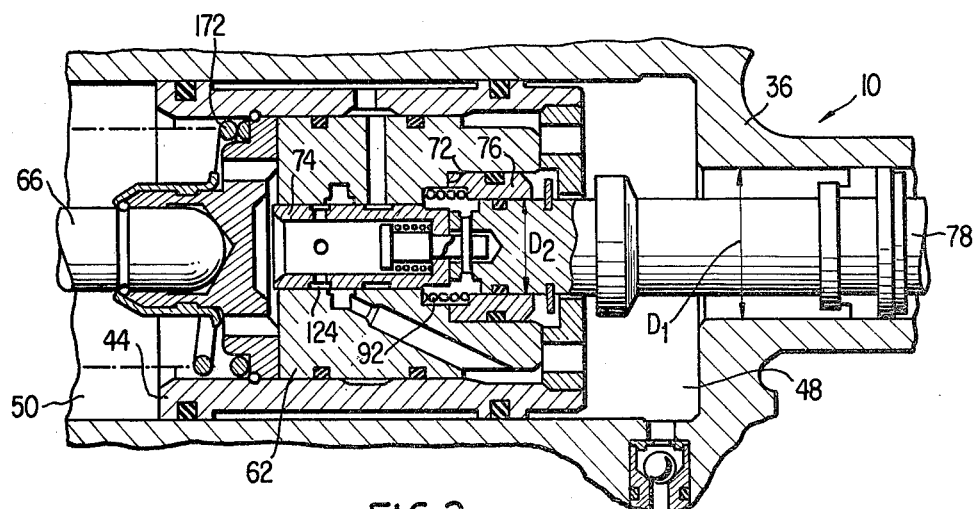
FIG. 3 is a sectional view explaining the operation of the portion of the reaction mechanism of hydraulic control valve assembly shown in FIG. 1.

In the operative position shown in FIG. 3, the engagement between input piston 78 and reaction regulating piston 76 is released and piston 78 receives the pressure in power chamber 48 which pushes piston 78 toward the right across the annular area thereof between diameters $D_1$ and $D_2$, that is to say, a reaction force which copes with the driver's operating force is transmitted thereto. Therefore, the pressure in power chamber 48 is regulated by variable restriction 124 so as to balance with the driver's operating force. In other words, the more spool 74 is moved to the left by increasing the driver's operating force, the more the pressure in power chamber 48 is increased by a correspondingly more effective restriction caused by variable restriction 124. Also, as the driver's operating force is decreased, the input piston 78 is returned by the pressure in power chamber 48 together with spool 74 with the result that the pressure in power chamber 48 is lessened by decreasing the restriction of variable restriction 124 such that the pressure in power chamber 48 is regulated in proportion to the driver's operating force or input force and, in turn, power piston 44 transmits the output force to an actuator, not shown, through output rod 66 in proportion to the pressure in power chamber 48. Therefore, as no reaction force is transmitted to the driver when the pressure in the power chamber 48 is lower than the predetermined value, the output force is transmitted to an actuator, not shown, by the considerably small operating force.

When the pressure in power chamber 48 is higher than the predetermined value, the output force transmitted from output rod 66 is proportionally regulated with respect to the operating force and is increased with a result that the response with regard to the increasing of the operating force is desirable.

When the driver rapidly operates input piston 78, there is short period of time within which no reaction force is transmitted to input piston 78 due to a lack of increase of pressure in power chamber 48 in spite of closure of variable restriction 124. Therefore, input piston 78 is further moved to the left to establish fluid communication between groove 120 and groove 98 such that the fluid in inlet 12 is supplied to power chamber 48 through passage 100, grooves 120 and 98, and passages 102 and 104 to hasten the increase of pressure in power chamber 48. During this time period, power piston 44 is in a manually operating situation insofar as power piston 44 is mechanically forwarded by input piston 78 by the contacting of projection 90 with nut 64, with the result being that the volume of power chamber 48 is increased.

When the pressure in power chamber 48 is restored and increased, input piston 78 is relatively returned to the right with regard to power piston 44 in that the pressure in power chamber 48 acts on input piston 78 as a reaction force, such that variable restriction 124 is opened to regulate the pressure in power chamber 48. As the pressure in the main pump 22 is not increased more than a predetermined value, to be relieved when the input force is excessive, the pressure in power chamber 48 is equal to the predetermined value in inlet 12 which is relieved by further forwarding input piston 78 to close variable restriction 124 and to establish fluid communication between groove 120 and groove 98. Therefore, as the pressures between first and second chambers 138 and 140 become equal, spool 128 is moved toward the left by spring 130, variable restriction 162 is closed and groove 148 communicates with the groove 144. Accordingly, the fluid in inlet 12 is supplied to outlet 14 through variable restriction 160, passage 156, orifice 152, passage 150, groove 148 and groove 144.

In this situation, as the fluid in passage 150 does not flow into second chamber 140 through orifice 154, the pressure in second chamber 140 becomes equal to the pressure in passage 150. When fluid flows through orifice 152 in the above described manner a pressure difference across orifice 152 is produced, that is to say, a pressure difference between first and second chambers 138 and 140, respectively, is produced. The force which raises a pressure difference between first and second chambers 138 and 140, which in turn, operates against the cross-area of spool 128 becomes the force which offsets the force of spring 130 and acts as the force which interrupts fluid communication between grooves 148 and 144. Therefore, the pressure difference across orifice 152 is nearly equal to the force of spring 130 and the fluid flow quantity which is disgorged from outlet 14 through the orifice 152 is almost fixedly regulated to thereby enable the operation of hydraulic device 26 which is connected to outlet 14. When fluid is not supplied to power chamber 48 from passage 164 as a result of, for example, an accident ot main pump 22, hydraulic device 26 is operated by the fluid which is supplied to power chamber 48 from second pump 30 through inlet 18.

Figure 4:
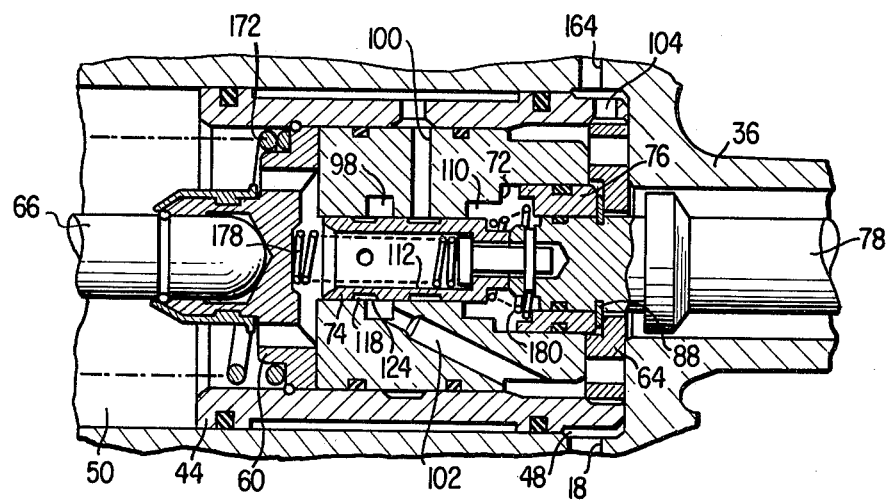
FIG. 4 is a similar view to FIG. 1, but showing a cross section of another embodiment of the reaction mechanism of the hydraulic control valve assembly constructed in accordance with the teachings of this invention.

In FIG. 4, there is shown a second embodiment of the present invention. In the first embodiment as shown in FIG. 1, the engagement or disengagement between regulating reaction piston 76 and input piston 78 is accomplished by spring 92 which returns input piston 78. However, in the second embodiment, the engagement or disengagement between reaction regulating piston 76 and input piston 78 is accomplished by springs 178 and 180. The second embodiment has the same construction as the first embodiment, except for springs 178 and 180, wherein corresponding parts are shown by the same reference numerals.

Spring 178 is provided as being of the same strength as spring 92 in FIG. 1, however, spring 180 is either stronger or weaker than spring 178. Spring 178 is interposed between holder 60 and input piston 78, and spring 180 urges reaction regulating piston 76 to stopper ring 88, one end of spring 180 engaging with spool 74 while the other end engages with reaction regulating piston 76. Spool 74 is urged to input piston 78 by spring 178, such that spool 74 and input piston 78 operate as a single body.

When the driver moves input piston 78 against spring 178, a restricted fluid flow is provided through variable restriction 124 so as to increase the pressure in power chamber 48 which is an upper stream position with respect to variable restriction 124. Therefore, power piston 44 is moved toward the left against spring 172 by the pressure in power chamber 48 to thus operate output rod 66. As reaction piston 76 is in contact with input piston 78 by spring 180 until the pressure in power chamber 48 reaches to the predetermined value, input piston 78 scarcely receives a reaction force.

When the force due to the pressure in power chamber 48 acts on the right end of reaction regulating piston 76, the increase in pressure overcomes the force of spring 180 and reaction regulating piston 76 is displaced with respect to input piston 78 and comes in contact with shoulder 72. In this situation, input piston 78 received a larger reaction force in the same manner as described with respect to the first embodiment shown in FIG. 1. Thereafter, the operation is identical with the operation of the first embodiment in FIG. 1. In the second embodiment in FIG. 4, a variation in the pressure of power chamber 48 when the reaction regulating piston 76 is displaced from input piston 78 is possible by changing the pre-load of spring 180 as preferred.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A reaction mechanism which comprises:
   at least one pump;
   a control valve for regulating hydraulic pressure by controlling hydraulic fluid disgorged from said pump;
   an input member mechanically connected to said control valve and operated by a driver, said input member having a smaller diameter portion and a larger diameter portion, the larger diameter portion being located closest to the driver;
   an annular reaction regulating member in which said smaller diameter portion of said input member is slidably inserted;
   biasing means for normally urging said annular member toward said larger portion of said input member; and
   means for supplying said hydraulic pressure regulated by said control valve into an area between said annular member and said larger diameter portion of said input member to displace said annular member in a direction away from said larger diameter portion of said input member and in the same direction as the displacement of the input member against said biasing means; whereby the displacement of said annular member reduces the reaction of said input member to variations of said hydraulic pressure when said hydraulic pressure is below a predetermined value.

2. The reaction mechanism of claim 1, wherein said means for supplying hydraulic pressure comprises:
   connecting means for conveying fluid from said control valve to said area between said annular member and said larger diameter portion of said input member;
   a first spool located adjacent said annular member and including an annular groove; and
   a flow restriction member selectively connecting a passage member communicating with said hydraulic pressure and said first spool annular groove for regulating said hydraulic pressure in said area between said annular member and said larger diameter portion of said input member.

3. The reaction mechanism of claim 2, wherein:
   said biasing means is displaced between said annular member and said flow restriction member.

4. The reaction mechanism of claim 1, wherein said control valve comprises:
   a housing including an inlet connected to said pump; and
   a second spool connecting said inlet and forming a first and a second chamber wherein said first chamber is operatively associated with said inlet and said second chamber is operatively associated with said means for supplying said hydraulic pressure.

5. The reaction mechanism of claim 4, which further comprises:
   a one-way check valve displaced between said second spool and said means for supplying said hydraulic pressure.

6. The reaction mechanism of claim 5, which further comprises:
   said housing including an outlet adjacent said inlet; and
   a variable restriction member, operatively associated with said second spool, selectively connecting said inlet to said outlet in response to said operation of said input member.

7. The reaction mechanism of claim 1, which further comprises: a check valve assembly including;
a housing provided with an inlet, operatively associated with said pump, and a horizontal passage;
a second spool having a groove formed thereon interconnecting said inlet and said horizontal passage;
second fluid flow means operatively associated with said area between said annular member and said larger diameter portion of said input member in response to said operation of said input member.

8. The reaction mechanism of claim 7, said check valve assembly further comprises:
a one-way check valve interconnecting said housing horizontal passage with said second fluid flow means.

9. A reaction mechanism which comprises:
at least one pump;
a control valve for regulating hydraulic pressure by controlling hydraulic fluid disgorged from said pump;
an input member mechanically connected to said control valve and operated by a driver, said input member having a smaller diameter portion and a larger diameter portion the larger diameter portion being located closest to the driver;
an annular reaction regulating member in which said smaller diameter portion of said input member is slidably inserted;
a first spool located adjacent said annular member;
first biasing means for normally urging said annular member toward said larger portion of said input member;
second biasing means for normally urging said first spool to said input member; and
means for supplying said hydraulic pressure regulated by said control valve into an area between said annular member and said larger diameter portion of said input member to displace said annular member in a direction away from said larger diameter portion of said input member and in the same direction as the displacement of the input member against said biasing means; whereby the displacement of said annular member reduces the reaction of said input member to variations of said hydraulic pressure when said hydraulic pressure is below a predetermined value.

10. The reaction mechanism of claim 9, wherein said means for supplying hydraulic pressure comprises:
connecting means for conveying fluid from said control valve to said area between said annular member and said diameter portion of said input member;
said first spool located adjacent said annular member including an annular groove; and
a flow restriction member selectively connecting a passage member communicating with said hydraulic pressure and said first spool annular groove regulating said hydraulic pressure in said area between said annular member and said larger diameter portion of said input member.

11. The reaction mechanism of claim 10, wherein:
said first biasing means is displaced between said annular member and said flow restriction member.

12. The reaction mechanism of claim 9, wherein said control valve comprises:
a housing including an inlet connected to said pump; and
a second spool connecting said inlet and forming a first and a second chamber wherein said first chamber is operatively associated with said inlet and said second chamber is operatively associated with said means for supplying said hydraulic pressure.

13. The reaction mechanism of claim 12, which further comprises:
a one-way check valve displaced between said second spool and said means for supplying said hydraulic pressure.

14. The reaction mechanism of claim 13, which further comprises:
said housing including an outlet adjacent said inlet; and
a variable restriction member, operatively associated with said second spool selectively connecting said means for supplying said hydraulic pressure.

15. The reaction mechanism of claim 9, which further comprises a check valve assembly including;
a housing provided with an inlet, operatively associated with said pump, and a horizontal passage;
a second spool having a groove formed thereon interconnecting said inlet and said horizontal passage;
second fluid flow means operatively associated with said area between said annular member and said larger diameter portion of said input member in response to said operation of said input member.

16. The reaction mechanism of claim 15, said check valve assembly further comprises:
a one-way check valve interconnecting said housing horizontal passage with said second fluid flow means.

* * * * *